No. 685,881. Patented Nov. 5, 1901.
J. F. THEURER.
FILTER.
(Application filed May 21, 1900.)

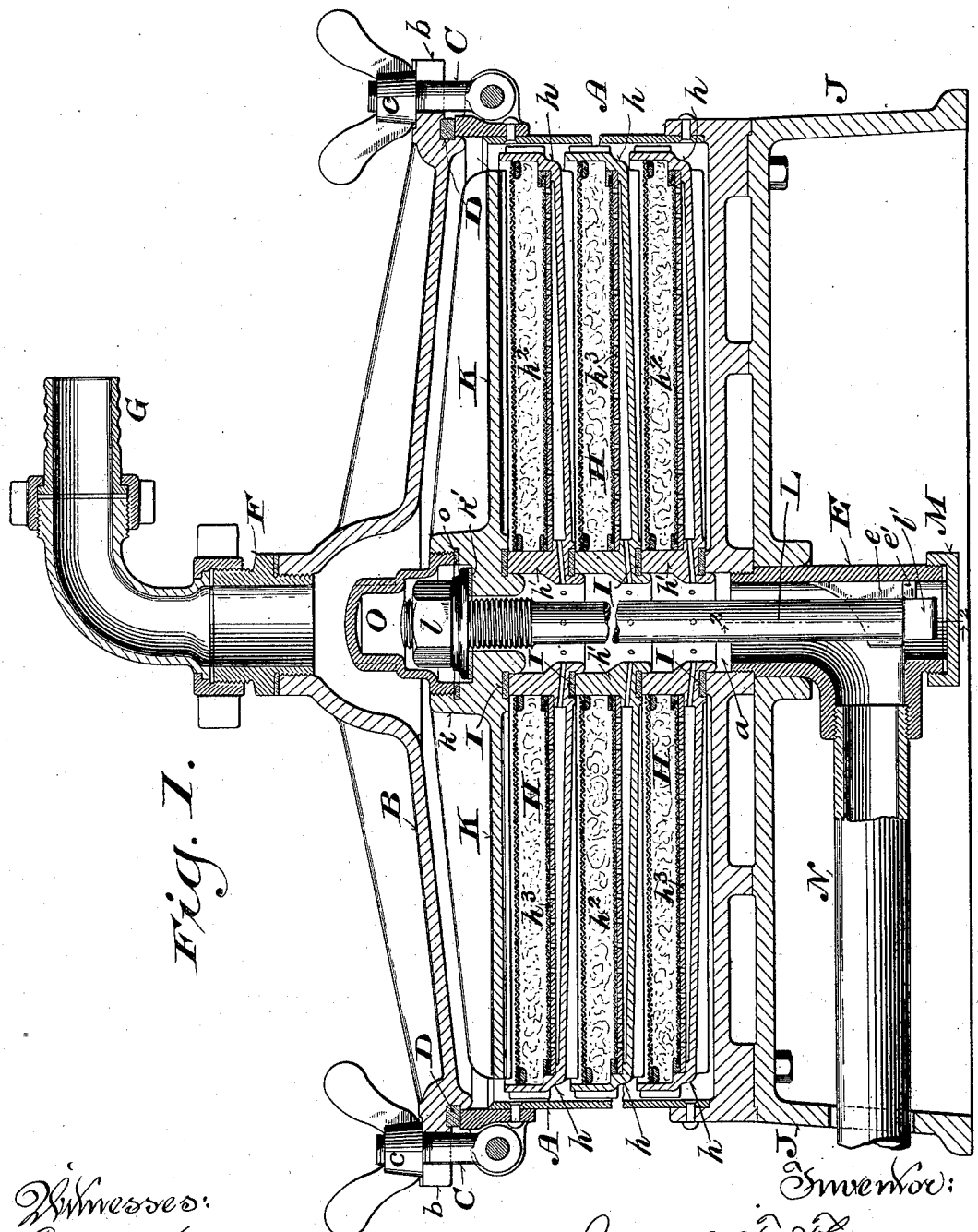

(No Model.) 2 Sheets—Sheet 2.

Witnesses:
Geo. W. Young.
Chas. L. Goss.

Inventor:
Jacob F. Theurer,

UNITED STATES PATENT OFFICE.

JACOB F. THEURER, OF MILWAUKEE, WISCONSIN, ASSIGNOR TO INDEPENDENT FILTER COMPANY, OF CHICAGO, ILLINOIS, A CORPORATION OF ILLINOIS.

FILTER.

SPECIFICATION forming part of Letters Patent No. 685,881, dated November 5, 1901.

Application filed May 21, 1900. Serial No. 17,346. (No model.)

*To all whom it may concern:*

Be it known that I, JACOB F. THEURER, a citizen of the United States, residing at Milwaukee, in the county of Milwaukee and State of Wisconsin, have invented certain new and useful Improvements in Filters, of which the following is a specification, reference being had to the accompanying drawings, forming a part thereof.

My present invention relates to "battery-filters" of the kind shown in United States Letters Patent No. 618,964, issued to me February 7, 1899. Its main objects are to prevent the separation of the filter elements or sections by the internal pressure to which the filter is subjected, and consequent leakage of the liquid to be filtered between the elements and sections without passing through them, and also to facilitate removing and replacing the elements or sections and securely binding them together.

It consists in certain novel features in the construction and arrangement of the component parts of a filter of this class and pertains particularly to the means employed for securely fastening and holding the elements or sections of the filter together against the pressure tending to separate them, as hereinafter particularly described, and pointed out in the claims.

In the accompanying drawings like letters designate the same parts in the several figures.

Figure 3:
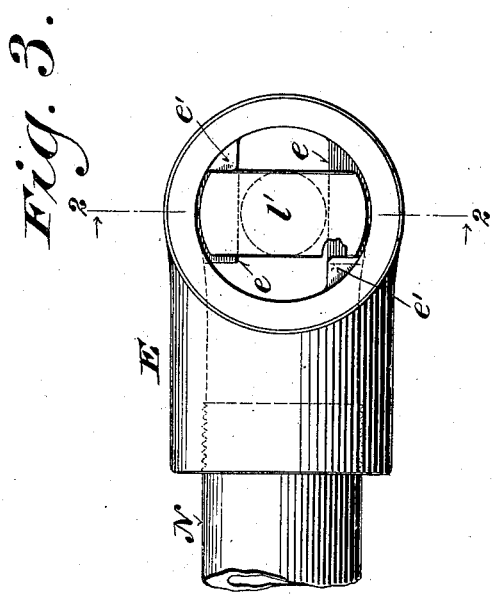
Figure 2:
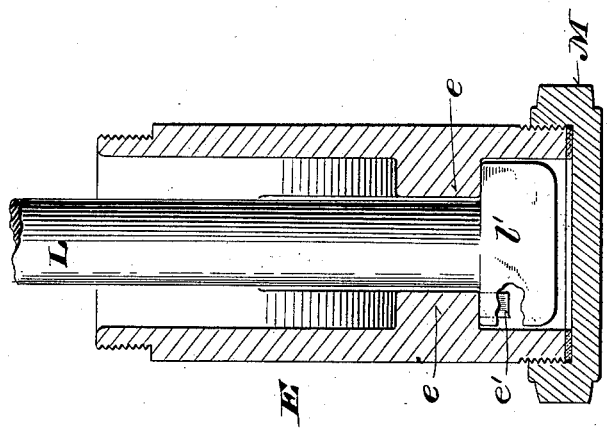

Figure 1 is a vertical medial section of the upper and lower portions of a filter embodying my improvements; and Figs. 2 and 3 are detail views, on a greatly-enlarged scale, of the outlet connection at the bottom of the filter and the lower end of the clamping-rod for binding the filter elements or sections together, Fig. 2 being a vertical section on the line 2 2, Figs. 1 and 3, and Fig. 3 an inverted plan view without the cap at the lower end of said connection.

In filters of this class, in which the elements or sections are clamped and held together between and by the bottom and cover of the main casing, as shown in my former patent above referred to, considerable trouble has been experienced from the separation of the elements or sections by internal pressure and the leaking of unfiltered liquid between the sections into the central outlet-passage. It is the primary object of my present improvements to obviate this difficulty.

Referring to Fig. 1 of the drawings, A designates the casing, which is usually of cylindrical form, and B is the removable cover of the casing, which is detachably secured thereto by eyebolts C, pivoted to the rim of the casing and provided with wing-nuts $c$ for engaging forked lugs $b$ on the rim of the cover, and clamping the same tightly upon a gasket or packing ring D, between it and the casing. The bottom of the casing is formed with a central flanged opening $a$, and in this opening is screwed or otherwise secured a T-shaped pipe-section E, constituting the outlet or discharge connection of the filter. The cover B, which is preferably slightly arched, is formed at the center with a recess or cavity on the under side and a central opening in which is screwed or otherwise secured a pipe or hose coupling F, with which the inlet pipe or hose G is connected.

H H are the filter elements or sections, which are arranged one above another within the casing A and have central openings registering with each other and with the opening in the bottom of said casing, thereby forming the outlet or discharge passage of the filter. These elements or sections may be built up or constructed in various ways. In the present case each element or section consists of a pan or holder $h$, having an upturned marginal rim and a central flanged opening or hollow hub $h'$, and of a filter-body $h^2$, composed of compressed pulp or other suitable material contained in said pan or holder between two wire screens. The bottoms of the pans or holders $h$ are inclined downwardly toward the center and are formed on both their upper and under sides with radial ribs the bearing-faces of which lie in horizontal planes. Upon the upper ribs and annular ledges formed at their ends in the bottom of the pans or holders $h$ perforated metal plates $h^3$ are placed, and upon these plates the filter-bodies $h^2$ are supported. These ribs serve to hold the wire screens and the interposed filter-bodies in place and also to form channels between the several elements or sections for the inflowing liquid, as well as channels below the perforated plates $h^3$ for the outflowing liquid. The spaces or channels between the bottoms of the pans or holders $h$ and the perforated plates $h^3$ communicate with the central openings in the filter elements or sections through the hubs $h'$. The several elements or sections are supported one upon another entirely or mainly by their central hubs or bosses $h'$, between which are interposed suitable gaskets or packing-rings I, the hub or boss of the lower element or section resting upon the flange around the outlet-opening $a$ in the bottom of the casing. The bottom of the casing A is reinforced and supported in an elevated position by a hollow base J.

K is a compression-plate formed with a central flanged opening or recessed hub $k$, which is adapted to bear upon the hub of the upper filter element or section H.

L is a clamping-rod threaded and provided with a nut $l$ at its upper end and formed at its lower end with an elongated head $l'$, which is adapted by a quarter-turn of said rod to be engaged with or disengaged from lugs $e\ e$, formed in the lower part of the pipe-section E, as shown in Figs. 2 and 3. Stops $e'$, also formed in said pipe-section below the lugs $e$, limit the movement of the head $l'$ in one direction in position to properly engage with said lugs. A quarter-turn of the rod in the other direction brings the head $l'$ into position to pass through the elongated opening between the lugs $e$. The lower end of the pipe-section E is preferably made open and provided with a screw-cap M, by means of which access may be had to the outlet connection of the filter from below without disconnecting the outlet-pipe N, which is attached to the lateral arm of said pipe-section E.

The nut $l$ on the upper end of the rod L when screwed down thereon bears against the hub $k$ or an interposed washer $k'$ and binds and firmly holds the hubs $h'$ of the filter elements or sections and the bottom of the casing together. The separation of said elements or sections around the central openings therein by the internal pressure to which the filter is subjected and the springing of the cover and the leakage of unfiltered liquid into the outlet-passage are thus effectually prevented. The opening in the upper end of the hub $k$ over the upper end of the rod L and its nut $l$ is closed by a screw-cap O, which bears at its lower edge upon a packing-ring $o$, thus preventing unfiltered liquid from entering the outlet-passage through the opening in the plate K around the rod L. The cap O projects upwardly into the central recess in the cover B, an annular space or passage being left between said cap and the cover for the inflowing liquid.

Access is obtained to the filter by simply detaching the inlet-pipe G, loosening the nuts $c$, and removing the cover B. The filter elements or sections H may be removed by unscrewing the cap O and the nut $l$. The rod L may be removed by giving it a quarter-turn to disengage its head $l'$ from the lugs $e\ e$. It will thus be seen that provision is made for readily obtaining access to all parts of the filter for the purpose of repairing or cleaning the same and for removing and replacing the filter elements or sections.

I claim—

1. In a filter the combination of a casing having a central opening in the bottom and a removable cover, a series of filter-sections arranged one above another and comprising frames or holders having central hollow hubs or bosses, a compression-plate fitted to bear upon the hub or boss of the upper element or section and a clamping-rod for connecting said compression-plate with the bottom of the casing and binding the several interposed elements or sections together at the center, substantially as and for the purposes set forth.

2. In a filter the combination of a casing having a central opening in the bottom and a removable cover, a series of filter elements or sections mounted one above another in said casing, and comprising frames or holders having central flanged openings through them, a compression-plate having a corresponding opening, and a clamping-rod detachably connected at its lower end with the bottom of said casing and provided with means for adjustably connecting it with said compression-plate and binding the several interposed elements or sections centrally together, substantially as and for the purposes set forth.

3. In a filter the combination of a casing having a removable cover and a central opening in the bottom, a series of filter elements or sections having central flanged openings and arranged one over another within said casing, and a removable clamping-rod passing through the openings in the several elements or sections and binding them together, substantially as and for the purposes set forth.

4. In a filter the combination of a casing having a removable cover and a central opening in the bottom, a series of filter elements or sections mounted one upon another in said casing and comprising frames or holders having central flanged openings registering with each other and with the opening in the bottom of said casing, a plate having a central opening and adapted to bear upon the frame or holder of the upper element or section around the opening therein, and a clamping-rod having at its lower end a head which is adapted to be turned into and out of engagement with lugs in the opening in the bottom of said casing, and at its upper end a nut adapted to be screwed down upon said bearing-plate and to bind the several filter elements or sections together around the central openings therein, substantially as and for the purposes set forth.

5. In a filter the combination of a casing having a removable cover and a central opening in the bottom, a series of filter elements or sections mounted one upon another within said casing and having central openings registering with each other and with the opening in the bottom of the casing, a compression-plate adapted to bear upon the upper element or section and having an opening registering with the opening therein and a cap for closing said opening, and a rod adapted to pass through the openings in the several elements or sections and to bind them centrally together, said rod having at its lower end an elongated head adapted to be engaged by a partial turn with lugs in the opening in the bottom of said casing and threaded at its upper end and provided with a nut adapted to bear upon the said compression-plate around the opening therein, substantially as and for the purposes set forth.

6. In a filter the combination of a casing having a central opening and pipe connection in the bottom and provided with a cover having a central opening and a detachable pipe connection, a series of removable filter elements or sections mounted one upon another within said casing and having central openings which register with each other and with the opening in the bottom of said casing, a plate adapted to bear upon the upper element or section around the opening therein and having an opening registering with the opening in said upper element or section, a tie-rod having a detachable connection at its lower end with the bottom of said casing and threaded at its upper end and provided with a nut which is adapted to engage with said bearing-plate and to bind the filter elements or sections together and to the bottom of the casing, and a removable cap adapted to close the opening in the top of said bearing-plate, substantially as and for the purposes set forth.

In witness whereof I hereto affix my signature in presence of two witnesses.

JACOB F. THEURER.

Witnesses:
A. F. LUMING,
J. BROUSSEAU.